Figure 1:
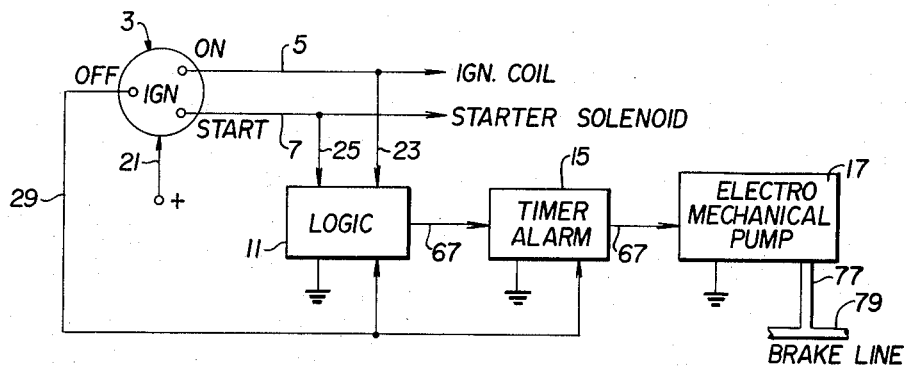

United States Patent

Webley

[15] 3,698,505
[45] Oct. 17, 1972

[54] VEHICULAR ANTI-THEFT BRAKE LOCKING DEVICE AND METHOD

[72] Inventor: Houston F. Webley, 102 Park Avenue, Herndon, Va. 22070

[22] Filed: May 17, 1971

[21] Appl. No.: 143,763

[52] U.S. Cl. ............... 180/114, 188/106 P, 188/163, 307/10 AT, 340/63
[51] Int. Cl. .............................................. H02g 3/00
[58] Field of Search..180/114, 82 R; 188/106 P, 163; 340/63, 64; 307/10 R, 10 AT

[56] References Cited

UNITED STATES PATENTS

| | | | |
|---|---|---|---|
| 2,891,628 | 6/1959 | Embry | 180/114 |
| 3,614,460 | 10/1971 | Hale | 307/10 AT |
| 3,657,697 | 4/1972 | Schultz | 340/64 |

Primary Examiner—Gerald M. Forlenza
Assistant Examiner—Robert J. Spar
Attorney—Wilfred G. Caldwell

[57] ABSTRACT

The invention applies to vehicular brakes for a predetermined time period whenever the vehicular coil or starting motor circuitry is energized with the ignition in the OFF position. A logic circuit is readied when the vehicle ignition is turned to the OFF position and/or the key removed. Subsequently, if the wires are crossed or a jumper used to excite the coil, starting solenoid or motor, the logic system senses this tampering and energizes an electro-mechanical pump to actuate a piston in an auxilliary cylinder connected to the vehicular brake system to apply and lock the brakes on under control of a timer. An alarm controlled by the timer may be sounded at any selected moment during the lock-up time. The circuitry is automatically reset at the expiration of the predetermined time to again sense his tampering and lock up the brakes if detected. Access is provided to the timer alarm to release the pump and alarm, but use of the ignition key is required to open the auxilliary cylinder.

11 Claims, 2 Drawing Figures

PATENTED OCT 17 1972  3,698,505

INVENTOR
HOUSTON F. WEBLEY

BY Wilfred G. Caldwell
ATTORNEY

VEHICULAR ANTI-THEFT BRAKE LOCKING DEVICE AND METHOD

A great majority of the automobiles stolen in the United States of America are taken because the wires behind the ignition switch were crossed or a jumper was used to start the vehicle's own engine and drive it away under its own power. The purpose of the present invention is to apply the brakes of the vehicle whenever an attempt is made to steal it and to maintain the brakes applied until the thieves have departed. A timer circuit is provided to time the application of the brakes and then automatically to release same in order that the vehicle is in condition for driving by the owner upon his return. However, the protective arrangement is such that in the event the thieves wait out the predetermined time period, i.e., 30 minutes to two hours, and then again attempt to steal the vehicle, the system will reapply the brakes for another predetermined time, and thus foil each burglary attempt.

Of course, it is essential that the protective arrangement not apply the brakes while the vehicle is being operated by the owner, and consequently, it can only function when the ignition system is turned to its OFF position or alternatively to a burglar alarm position if desired. In either event, the function is the same and the OFF or burglar alarm ignition position is that position which only permits withdrawing of the key from the ignition. Thus, the ignition switch is arranged with an extra contact strip which applies battery voltage (B+) to the OFF contact when the key is turned off regardless of whether it is withdrawn from the ignition or not. A readying lead is added to the vehicular electrical system and extends from the OFF contact of the ignition switch to a logic circuit which is triggered by positive potential from the ignition coil circuitry or the starter motor (including start solenoid circuitry). Thus, it will be appreciated that the logic circuit is only powered when the ignition is OFF and cannot be rendered effective during normal operation of the vehicle.

The purpose of the logic circuitry is to energize an electro-mechanical pump or equivalent electro-mechanical device to apply the piston of an auxiliary cylinder connected to the vehicle brake system for locking the vehicle brakes in an operative position. This is preferably accomplished through a timer alarm unit which may be settable by the operator to determine the period of brake application after which the brakes are automatically relieved and the vehicle is in ready condition for operation. The alarm feature, although not always necessary, is provided so that at any time during the predetermined period the alarm may be sounded to call attention to the attempted theft.

The logic circuitry is thus basically a gate circuit which receives power from the OFF position of the ignition switch and is triggered to permit power to pass to the electro-mechanical unit whenever the coil or starter motor circuitry is energized. A typical logic circuit is shown in the form of a transistor OR gate and inverter driver circuit, wherein a first transistor is triggered ON by exitation of the coil or starter motor circuitry. And, in turn, triggers ON a second driver transistor which supplies an operating pulse to the timer alarm circuitry. The timer alarm circuitry is a commercial unit inexpensively available of either the electrical RC type or electro-mechanical type. Upon triggering, it initiates the predetermined period and also extends B+ to the electro-mechanical pump to energize the same and cause the brakes to be applied as a result of pressure in the auxiliary cylinder. Obviously the logic circuit is immediately reset upon the disappearance of coil and starter motor circuitry power as, for example, when the thieves disconnect the jumper.

The timer circuit releases the power applied to the electro-mechanical pump after a predetermined period so as not to run down the vehicle battery. It also renders the car operable for normal operation but it may be appreciated that insertion of the ignition key into the ignition lock and turning it from the off position also renders the protective circuit inoperative and the car ready for normal operation.

A feature of the invention provides a trap door or lead in the auxiliary cylinder which can only be opened by using the ignition key to unlock the same. This provides access to a reset button on the timer alarm unit to enable both the timer and alarm to be reset to ready the car for normal operation and to eliminate the noise of the alarm.

With the foregoing in mind, it is an object of the invention to provide a new method for protecting a vehicle from theft.

Another object of the invention is to provide a unique electro-mechanical arrangement for protecting a vehicle from unauthorized use.

Figure 2:
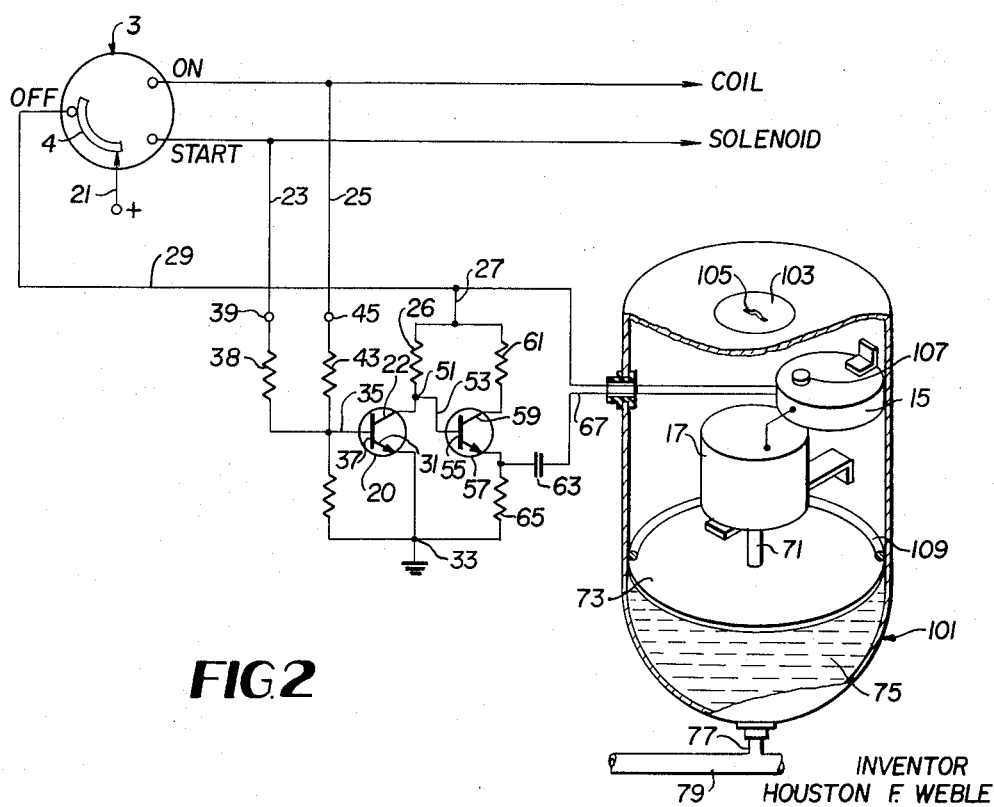

The invention will be better understood from the following detailed description thereof when taken in the light of the accompanying drawing wherein:

FIG. 1 is a block diagram showing the overall arrangement of the system of the invention; and FIG. 2 shows a detailed circuit in conjunction with the electro-mechanical auxiliary cylinder for application of the vehicular brakes in accordance with the teachings of the present invention.

Referring now to FIG. 1, there is shown a conventional ignition switch at 3 which includes the usual electrical lead 5 from the ON contact to the ignition coil at a different lead 7 from the start contact to the starter motor solenoid. A separate power lead 29 has been added from the OFF connection to the added logic circuit 11, and annexed timer alarm unit 15. The timer alarm 15 extends B+ via lead 67 to electro-mechanical pump 17 which in turn increases the pressure in the vehicular brake line 79 via an added inter-connection 77.

It may be appreciated that the logic circuit is powered or readied from battery power from battery lead 21 via ignition switch 3 and OFF contact and power lead 29. Logic circuit 11 may be triggered from potential ON lead 23 from the ignition coil lead 5 or by potential ON lead 25 from the starter circuitry lead 7. Triggering of logic circuit 11 applies a signal over lead 67 to initiate timer alarm circuitry 15 and extends B+ over the continuation lead 67 to electro-mechanical pump 17 for energizing the vehicular brake system via brake line 79.

In FIG. 2 there is shown a specific detailed system for effecting the principles of the invention. Thus, the ignition switch 3 is equipped with an added sliding contact 4 which extends potential from battery lead 21 to the OFF contact power lead 29 whenever the ignition is in the OFF position. Otherwise, contact 4 is revolved away from positive lead 21 and another arcuate contact segment conventionally takes over for the ON and start functions. The electro-mechanical arrangement of FIG. 2 details a preferred type logic for use in the present system. Basically, the function of the logic circuitry is to assume a ready condition upon turning the key to the OFF position and/or removal of the key, such that any subsequent energization of either the coil or starter motor or solenoid for the starter motor or any one, two or more of these components, will assure triggering of the circuitry to apply energization to the electro-mechanical pump 17 for application of the vehicular brakes (not shown).

In particular, in FIG. 2, there is shown a simple transistor OR gate and inverter driver to trigger the electro-mechanical pump 17 via the timer and/or alarm 15. A first transistor 20 of, for example, the ZN3901 type (NPN) has its collector 22 connected via load resistor 26 and common lead 27 to the B+ power supply lead 29 extending from the OFF contact of the ignition switch, emitter 31 being grounded at 33. Lead 29 may be hidden or armour protected.

Alternative input circuits are provided to the input lead 35 for base 37. The first of these input circuits comprises voltage divider resistor 38 connected between input terminal 39 and common lead 35. To terminal 39, there is connected the lead 25 extending to the starter motor circuitry, i.e., to the starter motor solenoid or the starter motor itself such that energization of either or both of these components will provide a voltage input via resistor 38 to base 37 to trigger transistor 20 on. Lead 25 may be imbedded in the starter motor wiring to obscure same.

The orred or alternative input circuit for transistor 20 includes voltage divider resistor 43 connected between terminal 45 and common lead 35. To terminal 45 there is connected the lead 23 which extends to the coil circuitry for the vehicle. This circuitry may include the primary of the coil or may be imbedded in the coil and its lead to hide same, but in any event the application of voltage to lead 23 also insures turning transistor 20 on if it is not already operating.

When transistor 20 becomes conductive, the potential at junction point 51 (between lead resistor 26 and collector 22) is dropped so that a negative going pulse is applied over interconnection 53 to the base 55 of transistor 57, (e.g., ZN3906 of PNP type) its emitter 59 being connected over limiting resistor 61 and via lead 27 to the B+ power lead 29. Dropping of the base potential relative to the emitter 59 causes transistor 57 to conduct thereby providing a positive going pulse through isolation capacitor 63 (or printed as an input coupling to an electrical type timer) as a result of potential dropped across load resistor 65. The positive going pulse is applied to input triggering lead 67 which extends to the timer alarm and the electromechanical pump either directly or via the timer alarm, causing energization of the electro-mechanical pump and downward movement of its driven arm 71 to urge piston 73 downwardly against brake fluid 75 causing application of the brakes via connecting conduit 77 and brake line 79, the latter being a portion of the original vehicular braking system.

The timer alarm establishes an independent B+ path to the electro-mechanical pump to maintain the pump energized for the period set on the timer, which may be, for example, 30 minutes, 5 minutes or 2 hours. In the event the vehicle is housed in an area normally within audible range of people, it is usually desirable to sound the alarm, also. This is preferably done simultaneously with the application of the brake, but may be set to be actuated at a minute or two after application of the brake or alternatively some much later time, again depending upon the chances of its being heard.

The auxiliary or extra cylinder 101 includes the timer alarm 15 and electro-mechanical pump 17 and the only access to these components is via the removable cap or lid 103 provided with key slot 105, the key slot 105 preferably including a lock which uses the ignition key to open and close same to permit removal or cover 103 to reach the reset button 107 so that only the operator or person with the vehicle key may release the application of pump 17 prior to the expiration of the timer period or turn off the timer alarm 15 to quiet the alarm. It will be understood that in normal operation after the period of application of pump 17, the brakes will be automatically released but the circuitry is in readiness to re-apply the brakes in the event of energization of either the coil or starter motor circuitry so long as the ignition switch remains in the OFF position.

The cylinder 101 may be affixed to the vehicular brake system during the original manufacture of the vehicle or may be added subsequently to install the system on existing vehicles. It is preferably located near the top of the brake system and its connecting line 77 is joined in fluid-tight relation to the brake system depicted at 79. It does not interfere with the normal operation of the braking system because a stop 109 in the form of a ring or abutments is provided on the interior of cylinder 101 to prevent the piston 73 from being driven upwardly to render the brakes inoperative or mushy. A brake warning light (not shown) for low fluid or other metering device may be attached to cylinder 101 to signal low braking fluid and even enhance protection of the original braking equipment.

Stop 109 may actually comprise a smaller bore within cylinder 101 forming a shoulder against which the piston 73 abuts in its upper position, i.e., with the arm 71 returned upwardly to its home position in the electro-mechanical pump, as by a return spring. The weight of arm 71 and piston 73 is minimal because a light-weight piston 73 may be manufactured of aluminum with an "O" ring or piston ring seal or alternatively a hard rubber or the like piston may be employed because normally this device is a passive device and will only be energized on the rare instance of energization of the coil or starter motor circuitry when the ignition key is in the OFF position.

The timer alarm resets itself at the expiration of the predetermined period, and upon release of energization of the pump, its piston is urged upwardly by a return spring, relieving the brake pressure.

Under certain circumstances, it may be desirable to omit the timer alarm unit and operate the pump from the logic means.

What is claimed is:

1. A vehicular brake protective system for use with a vehicular key type ignition having an OFF contact, an ON contact supplying the ignition coil circuitry, and a START contact supplying the starter motor circuitry comprising in combination electrically actuable means for applying the vehicular brakes; logic means responsive to: the ignition in its OFF condition and at least one of the ignition coil and starter motor circuitry when energized to cause triggering of the logic circuit; and timer means responsive to triggering of the logic circuit to actuate the electrically actuable means to apply the vehicular brakes.

2. The apparatus of claim 1 wherein said electrically actuable means comprises an auxiliary cylinder in fluid connection with the brake system of the vehicle.

3. The apparatus of claim 2 wherein said auxiliary cylinder comprises access means and locking means for securing the access means to the auxiliary cylinder; said locking means adapted to receive only the same key for unlocking as fits the ignition switch.

4. The apparatus of claim 2 wherein said auxiliary cylinder includes therein the timing means and an electromechanical pump means for operating the brakes via the vehicular brake system.

5. The apparatus of claim 1 wherein said logic means comprises gate means for applying power to the electrically actuable means in response to energization of at least one of the vehicle coil circuitry and the vehicle starter motor circuitry when the ignition is OFF.

6. The apparatus of claim 5 wherein the gate means comprises OR gate means having a pair of input circuits; one of said input circuits extending to the ignition coil circuitry and the other of said input circuits extending to the starter motor circuitry.

7. The apparatus of claim 6 wherein the OR gate means comprises a first transistor adapted to be rendered conductive by either input circuit, and a second transistor adapted to be rendered conductive by the first transistor for energizing the timer means.

8. The apparatus of claim 7 including a B+ connection from the vehicular electrical system to the OFF connection of the ignition switch and from the OFF connection to the timer means and a further connection from the timer means to the electrical actuable means for extending B+ to the latter means when the timer means is actuated.

9. The apparatus of claim 8 wherein the timer means includes alarm means actuable during the timing period.

10. The method of protecting a vehicle from theft through use of the vehicle electrical system having an ignition switch with an OFF contact position, and ON contact extending to the ignition coil circuitry, and a START contact extending to the starter motor circuitry comprising the steps of: sensing for energization of at least one of the ignition coil circuitry and starter motor circuitry when the ignition switch is OFF; and increasing the pressure in the vehicular braking system when energization is sensed.

11. The method of claim 10 including the further step of deriving power from the OFF contact to operate the sensing step and to power the increasing pressure step.

* * * * *